(12) United States Patent
Gruber et al.

(10) Patent No.: US 12,120,624 B2
(45) Date of Patent: Oct. 15, 2024

(54) NETWORK SELECTION IN A NON-TERRESTRIAL NETWORK

(71) Applicant: Apple Inc., Cupertino, CA (US)

(72) Inventors: Roland Gruber, Sauerlach (DE); Robert Zaus, Munich (DE)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 17/660,230

(22) Filed: Apr. 22, 2022

(65) Prior Publication Data

US 2022/0369266 A1 Nov. 17, 2022

Related U.S. Application Data

(60) Provisional application No. 63/201,763, filed on May 12, 2021.

(51) Int. Cl.
*H04W 60/00* (2009.01)
*H04B 7/185* (2006.01)
*H04W 4/021* (2018.01)
*H04W 48/10* (2009.01)
*H04W 84/04* (2009.01)

(52) U.S. Cl.
CPC ........ *H04W 60/00* (2013.01); *H04B 7/18513* (2013.01); *H04W 4/021* (2013.01); *H04W 48/10* (2013.01); *H04W 84/042* (2013.01)

(58) Field of Classification Search
CPC ..... H04W 60/00; H04W 4/021; H04W 48/10; H04W 84/042; H04B 7/18513
See application file for complete search history.

(56) References Cited

U.S. PATENT DOCUMENTS

| | | | |
|---|---|---|---|
| 2002/0142781 A1 | 10/2002 | Wiedeman et al. | |
| 2019/0075511 A1 | 3/2019 | Ryu et al. | |
| 2022/0369266 A1* | 11/2022 | Gruber | H04W 48/10 |
| 2023/0209489 A1* | 6/2023 | Sugawara | H04W 48/18 |
| | | | 370/329 |
| 2023/0239827 A1* | 7/2023 | Niemi | H04W 60/04 |
| | | | 370/329 |

(Continued)

FOREIGN PATENT DOCUMENTS

| | | | | |
|---|---|---|---|---|
| CN | 113711651 B | * | 2/2024 | ......... H04L 65/1016 |
| CN | 117979276 A | * | 5/2024 | |

(Continued)

*Primary Examiner* — Adam D Houston
(74) *Attorney, Agent, or Firm* — Fay Kaplun & Marcin, LLP

(57) ABSTRACT

A user equipment (UE) is configured to receive broadcast information from a public land mobile network (PLMN) including at least a PLMN identifier (ID), attempt a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link, receive a message including a cause code indicating the PLMN is not allowed to operate at a current UE location and further including a set of attributes indicating further conditions wherein the registration with the PLMN is not allowed and avoid further registration attempts with the PLMN when the further conditions are met.

20 Claims, 5 Drawing Sheets

(56) References Cited

U.S. PATENT DOCUMENTS

| | | | | |
|---|---|---|---|---|
| 2023/0319756 A1* | 10/2023 | Gruber | ............... | H04W 48/16 |
| | | | | 455/435.1 |
| 2024/0007878 A1* | 1/2024 | Starsinic | ............... | H04W 48/10 |
| 2024/0014892 A1* | 1/2024 | Palermo | ............ | H04B 7/18513 |
| 2024/0121744 A1* | 4/2024 | Suh | ...................... | H04W 60/00 |
| 2024/0171267 A1* | 5/2024 | Edge | ................ | H04B 7/18545 |
| 2024/0172199 A1* | 5/2024 | Jung | ................... | H04L 5/0092 |

FOREIGN PATENT DOCUMENTS

| | | | | |
|---|---|---|---|---|
| EP | 3 751 908 | | 12/2020 | |
| EP | 3 751 952 | | 12/2020 | |
| EP | 4351240 A1 * | 4/2024 | ......... | H04W 36/083 |
| JP | 2024513098 A * | 3/2024 | | |
| RU | 2817767 C1 * | 4/2024 | | |
| WO | 2018/080606 | 5/2018 | | |
| WO | WO-2023154057 A1 * | 8/2023 | | |

\* cited by examiner

NETWORK SELECTION IN A NON-TERRESTRIAL NETWORK

PRIORITY CLAIM/INCORPORATION BY REFERENCE

This application claims priority to U.S. Provisional Application Ser. No. 63/201,763 filed on May 12, 2021, and entitled "Network Selection in a Non-Terrestrial Network," the entirety of which is incorporated by reference herein.

BACKGROUND

A user equipment (UE) may establish a connection to at least one of multiple different networks or types of networks. Signaling between the UE and the network may be achieved via beamforming. Beamforming is an antenna technique used to transmit a directional signal which may be referred to as a beam.

A non-terrestrial network (NTN) relates to a network utilizing non-terrestrial components, e.g., one or more satellites, to provide UE access to a public land mobile network (PLMN), e.g., a PLMN operating a 5G New Radio (NR) radio access network (RAN). A satellite-based NTN may provide broad network coverage across different regions. For example, a beam used by the satellite may have a large footprint that crosses a regional border. The PLMN may be restricted, due to legal or regulatory reasons, from providing network access in a particular region.

SUMMARY

Some exemplary embodiments are related to a processor of a user equipment (UE) configured to perform operations. The operations include receiving broadcast information from a public land mobile network (PLMN) including at least a PLMN identifier (ID), attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link, receiving a message including a cause code indicating the PLMN is not allowed to operate at a current UE location and further including a set of attributes indicating further conditions wherein the registration with the PLMN is not allowed and avoiding further registration attempts with the PLMN when the further conditions are met.

Other exemplary embodiments are related to a processor of a user equipment (UE) configured to perform operations. The operations include receiving broadcast information from a public land mobile network (PLMN) including at least a PLMN identifier (ID), attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link, receiving a registration reject including a cause code indicating the PLMN is not allowed to operate at a current UE location, determining further conditions wherein the registration with the PLMN is not allowed, wherein the further conditions are determined based on default geographical information defining an area within which the UE should not attempt the further registration attempts and avoiding further registration attempts with the PLMN when the further conditions are met.

Still further exemplary embodiments are related to a processor of a base station configured to perform operations. The operations include broadcasting information from a public land mobile network (PLMN) including at least a PLMN identifier (ID), wherein the base station is deployed in a non-terrestrial network (NTN) arrangement including a non-terrestrial component configured to provide services to a user equipment (UE) via a service link, receiving a registration request for the PLMN from the UE, determining a current UE location, determining the PLMN is not allowed to operate at the current UE location and transmitting a message to the UE including a cause code indicating the PLMN is not allowed to operate at the current UE location.

DETAILED DESCRIPTION

Figure 1:
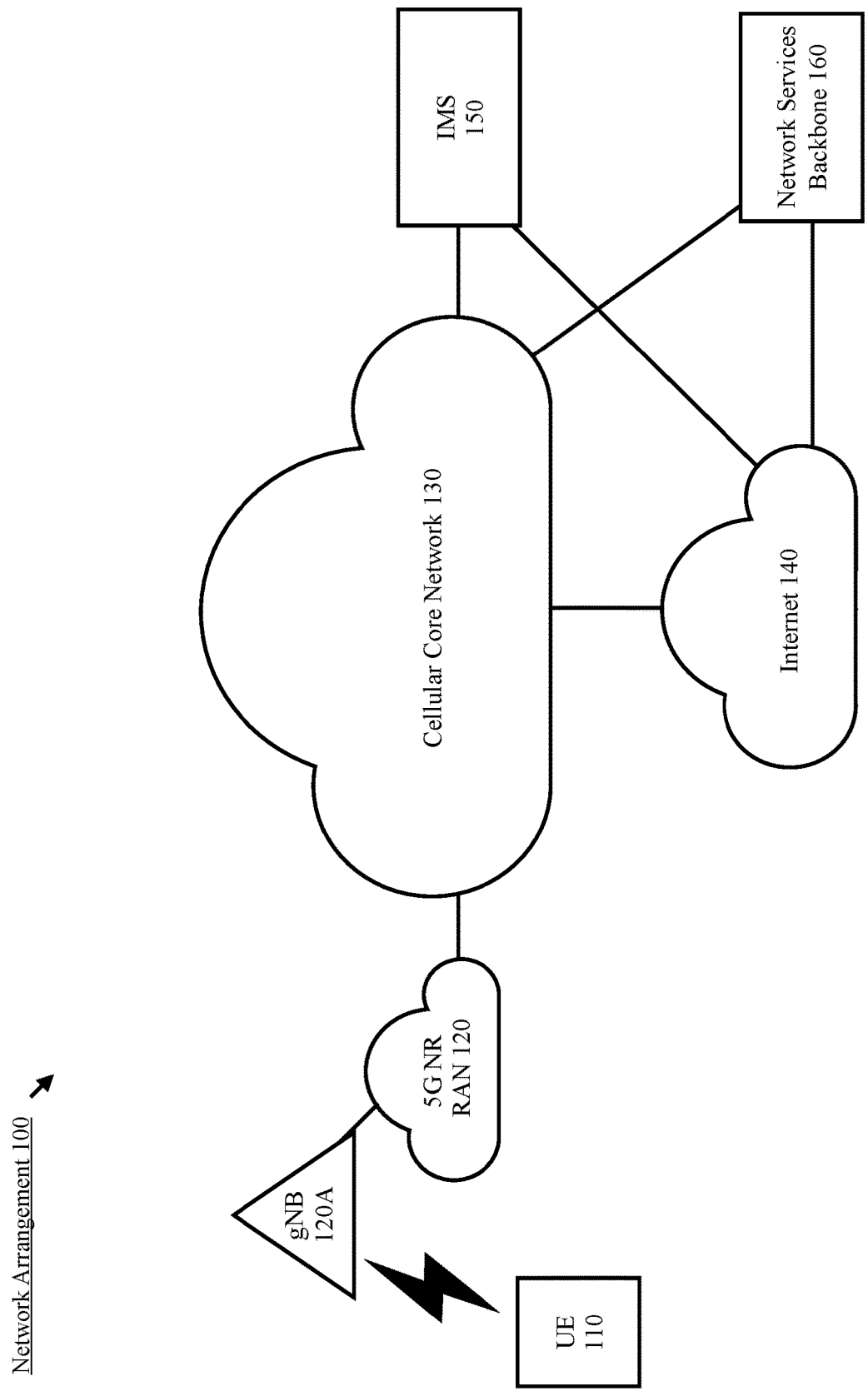
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component. The exemplary embodiments are also described with regard to a 5G New Radio (NR) network. However, reference to a 5G NR network is merely provided for illustrative purposes. The exemplary embodiments may be utilized with any network that may establish a connection to a UE and exchange information and data with the UE.

The exemplary embodiments are described with regard to a 5G NR network integrated with a non-terrestrial-network (NTN) utilizing one or more satellites to provide UE access to the 5G NR radio access network (RAN). A satellite-based NTN may provide broad network coverage across different regions, wherein a network provider, e.g., a public land mobile network (PLMN), may be restricted, due to legal or regulatory reasons, from providing network access in a particular region. According to some aspects described herein, the network may provide a geographical indication to a UE so that the UE will avoid attempting to access the PLMN. This indication may be provided to the UE in a registration rejection transmitted via satellite when the UE attempts to access the PLMN. The indication may also be provided in a service rejection or a deregistration request transmitted from the PLMN.

In one aspect, the network transmission may indicate a geographical region in which the UE should not attempt to access the particular PLMN. In another aspect, a list of unique beam or cell identifiers may be provided to the UE on which the UE should avoid attempting access. In this way, the UE may reduce unnecessary network access attempts that would continue to be rejected until the UE changes location to a region in which network access on the PLMN is allowed.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In the network arrangement 100, the 5G NR RAN 120 includes a base station (e.g., gNB 120A) that represents a gNB in a non-terrestrial network (NTN) deployment. For example, a satellite-based system may be integrated with the 5G NR RAN 120 to provide network access to the UE 110.

Figure 2:
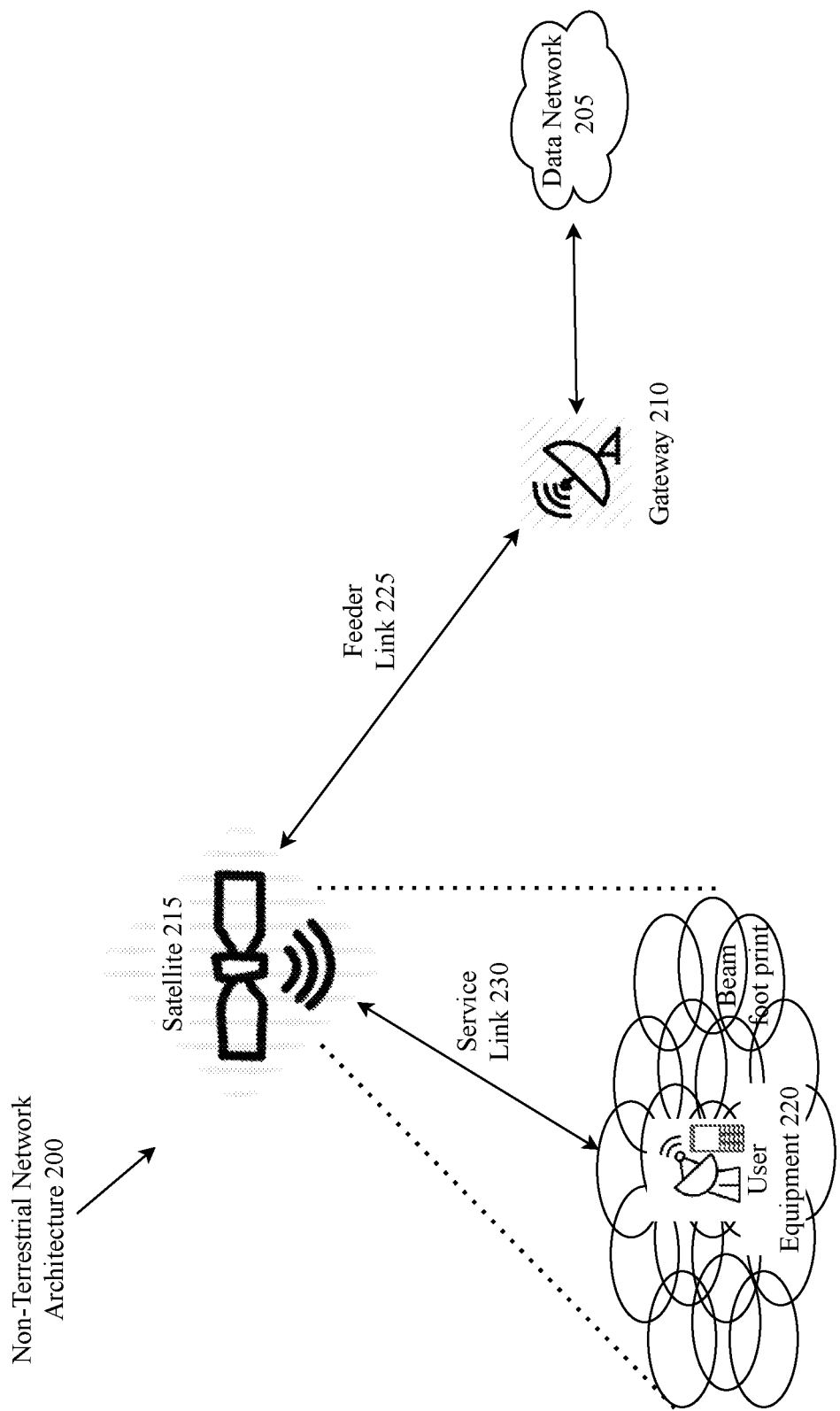
FIG. 2 shows an exemplary non-terrestrial network (NTN) architecture according to various exemplary embodiments.

FIG. 2 shows an exemplary non-terrestrial network (NTN) architecture 200 according to various exemplary embodiments. An NTN may relate to any network using non-terrestrial components, such as satellites, airplanes, unmanned aerial vehicles (UAVs), etc., to provide network services to a user terminal.

The NTN architecture 200 represents a network arrangement including one or more satellites 215 integrated with a data network 205. The data network 205 may be, for example, the 5G NR RAN 120 described above with respect to FIG. 1. The NTN architecture 200 includes a gateway 210 connecting the terrestrial data network 205 with the NTN components. In the NTN architecture 200 of FIG. 2, the gateway 210 and the satellite 215 communicate via a feeder link 225. However, any number of satellites 215 may communicate with any number of gateways 210 via any number of respective feeder links 225. For example, in some NTN deployments, some satellites may be served by several gateways simultaneously.

The satellite 215 provides network services to a UE 220 via a service link 230. The satellite 215 may implement either a transparent payload or a regenerative payload. A transparent payload refers to an arrangement where the satellite 215 receives signals and transmits an amplified version of the signal, with a frequency conversion. For example, the satellite 215 may receive uplink communications from the UE on service link 230 frequencies and transmit an amplified version of the signal to the network 205 on feeder link 225 frequencies, or may receive downlink communications from the network 205 on the feeder link 235 frequencies and transmit an amplified version of the signal to the UE 215 on the service link 230 frequencies. A regenerative payload refers to an arrangement where the satellite 215 acts as a distributed unit (DU) or a base station (e.g., a gNB), wherein received signals are regenerated with signal-processing techniques (e.g., demodulation, decoding, switching, encoding, modulation, etc.) before being retransmitted. The satellite 215 generates one or more beams over a service area bounded by its field of view, which is dependent on the antenna diagram and minimum elevation angle of the satellite 215. The footprints 235 of the beams are typically elliptically-shaped.

With reference to FIG. 1, in a regenerative payload arrangement, the gNB 120A may be located on an aerial component, e.g., the satellite 215 of FIG. 2. In a transparent payload arrangement, the gNB 120A may be located on the ground and the satellite 215 is used to mirror the signals between the gNB 120 and the UE 110, as described above.

The example shown in FIG. 2 is not intended to limit the exemplary embodiments in any way. Those skilled in the art will understand that NTNs may be integrated with the 5G NR RAN and/or other networks in any of a variety of manners. For example, a typical satellite-based NTN may comprise a low earth orbit (LEO) constellation including an array of satellites and gateways with broad interconnectivity via ground-to-ground station (G2G) links, satellite-to-satellite (S2S) links, ground-to-satellite (G2S) links, and satellite-to-ground (S2G) links. Other types of satellite-based NTNs include geostationary-orbiting (GEO) satellites or medium-earth-orbiting (MEO) satellites. The different types of NTNs each have respective strengths and weaknesses and may be deployed in a variety of scenarios, depending on the goal to be achieved, e.g., broad coverage across a large region, concentrated coverage in an urban environment or along a highly-trafficked route, etc. Thus, the NTN architecture 200 described in FIG. 2 is merely provided for illustrative purposes.

Returning to the network arrangement 100 of FIG. 1, the gNB 120A may include one or more communication interfaces to exchange data and/or information with UE 110, the corresponding RAN, the cellular core network 130, the internet 140, etc.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
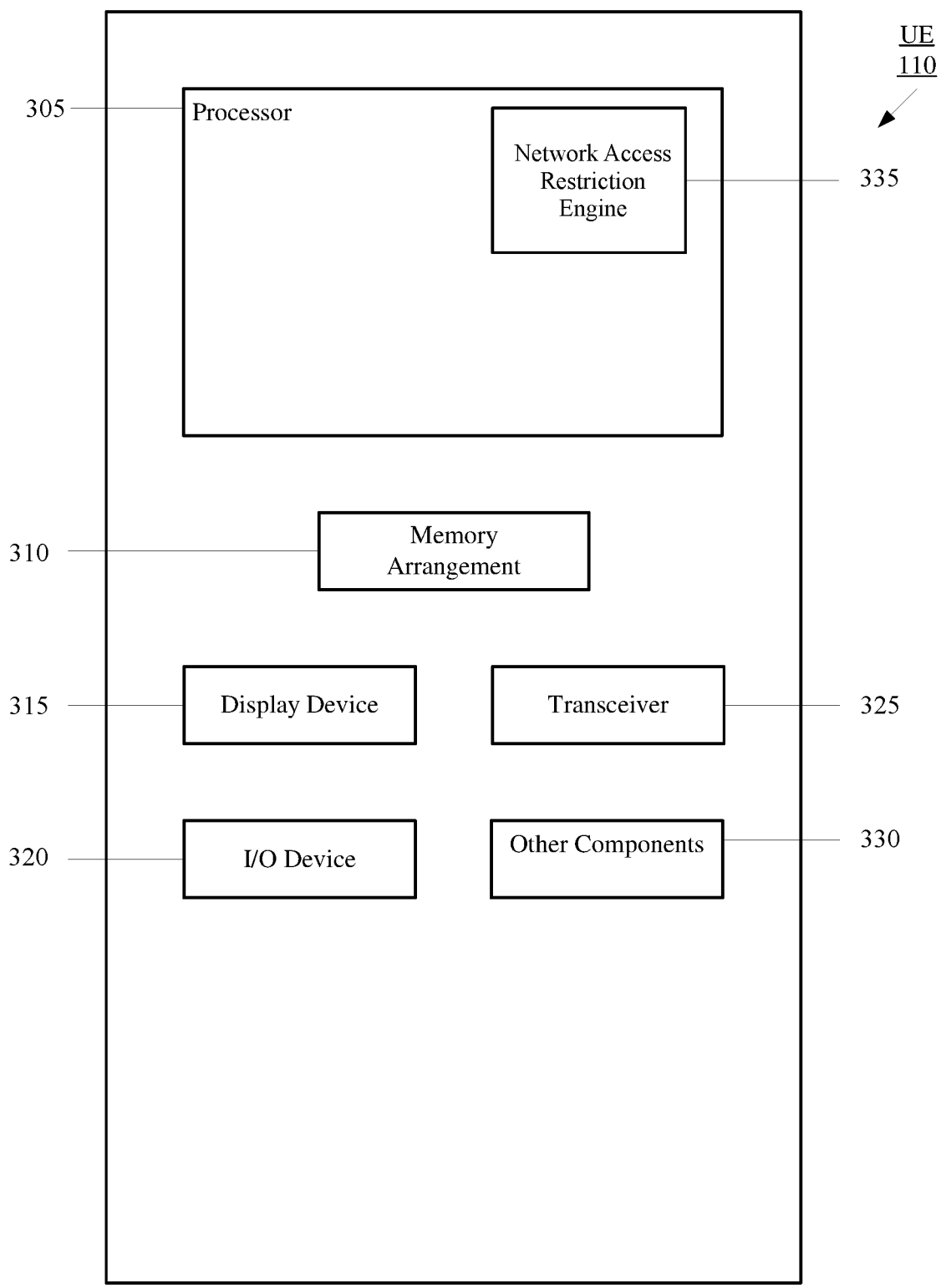
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a network access restriction engine 335 configured to perform operations including determining, based on information provided by the network, whether the UE should attempt to access the network. For example, based on geographical information or beam/cell information, the UE may avoid attempting to register with the network until the UE is located in a region wherein access to the network is allowed, to be described in further detail below.

The above referenced engine being an application (e.g., a program) executed by the processor 305 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
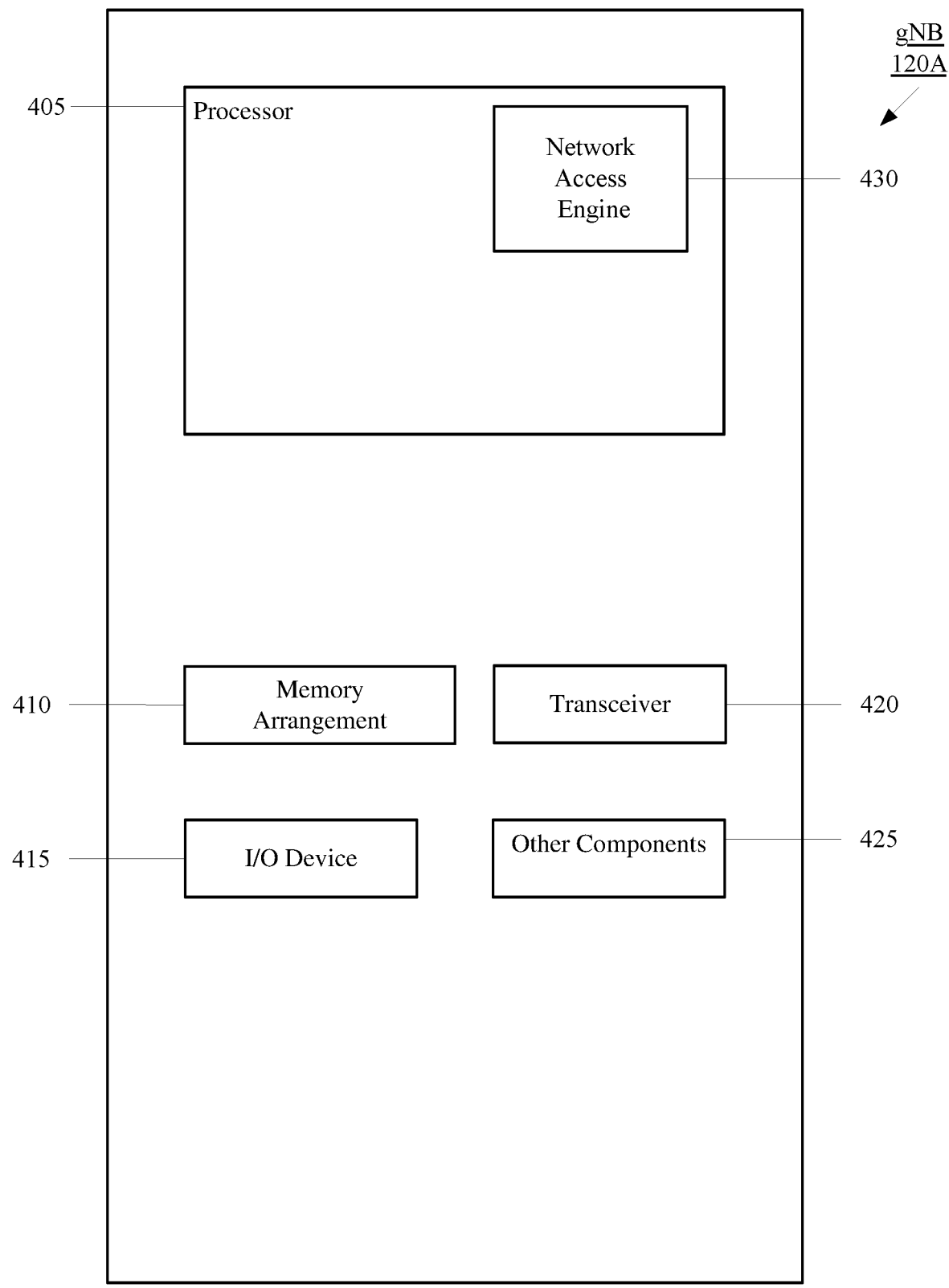
FIG. 4 shows an exemplary base station according to various exemplary embodiments.

FIG. 4 shows an exemplary base station, e.g., gNB 120A, according to various exemplary embodiments. The gNB 120A may represent any access node through which the UE 110 may establish a connection and manage network operations.

The gNB 120A may include a processor 405, a memory arrangement 410, an input/output (I/O) device 415, a transceiver 420, and other components 425. The other components 425 may include, for example, a battery, a data acquisition device, ports to electrically connect the base station to other electronic devices, etc.

The processor 405 may be configured to execute a plurality of engines of the gNB 120A. For example, the processor 405 of the gNB 120A may execute a network access engine 430 that may cause the gNB 120A to perform operations including rejecting network access attempts when a UE is located in a region wherein the network cannot provide network services. The network access engine 430 may be further configured to provide additional information to the UE regarding geographical areas and/or cells/beams wherein the UE should avoid further access attempts, to be described in further detail below. However, reference to a processor 405 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some base stations, the functionality described for the processor 405 is split among a plurality of processors (e.g., a baseband processor, an applications processor, etc.). The exemplary embodiments may be implemented in any of these or other configurations of a base station.

The memory 410 may be a hardware component configured to store data related to operations performed by the gNB 120A. The I/O device 415 may be a hardware component or ports that enable a user to interact with the gNB 120A. The transceiver 420 may be a hardware component configured to exchange data with the UE 110 and any other UE in the system 100. The transceiver 420 may operate on a variety of different frequencies or channels (e.g., set of consecutive frequencies). Therefore, the transceiver 420 may include one or more components (e.g., radios) to enable the data exchange with the various networks and UEs.

Figure 5:
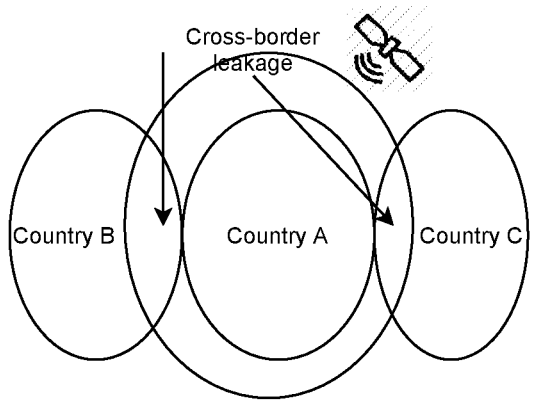
FIG. 5 shows an exemplary beam coverage scenario in which the coverage provided by a satellite crosses the borders of the country in which the PLMN is allowed to operate.

A UE may attempt to access a public land mobile network (PLMN), e.g., register with the network, when information broadcast from the network is detected by the UE, including, e.g., a PLMN ID comprising a mobile country code (MCC) and a mobile network code (MNC). The UE may then initiate registration by transmitting a registration request to the PLMN. In some scenarios, an NTN deployed by the PLMN may provide beam coverage wherein the beam crosses a regional border. FIG. 5 shows an exemplary beam coverage scenario in which the coverage provided by a satellite crosses the borders of the country in which the PLMN is allowed to operate. This scenario may be referred to as cross-border leakage. However, other scenarios may arise in which PLMN beams may cross the borders of the region in which the PLMN is allowed to operate, due to regulatory or legal restrictions. Thus, the person skilled in the art would understand that the exemplary embodiments are not limited to cross-border leakage scenarios.

When the UE is located in a geographical position in which, due to regulatory or legal restrictions, the network is not allowed to provide services, the PLMN may reject registration attempts from the UE. A cause code may be included in the registration rejection, e.g., cause code #78, "PLMN not allowed to operate at the present UE location," when the PLMN is not allowed to offer any services to the UE. The registration reject may be in response to an initial registration request, or a mobility registration request.

A PLMN may be allowed to operate only within the geographical borders of the country of the MCC for the PLMN. The International Telecommunication Union (ITU) Telecommunication Standardization Sector (ITU-T) has allowed some exceptions to this general rule, for example in areas adjacent to the border, and in certain cases, a PLMN may be allowed to operate in a foreign country, i.e., in a country for which the MCC assigned by ITU-T is different from the MCC broadcast by the PLMN. However, this type of access is generally restricted.

To help the UE to select a PLMN which is allowed to operate at the present UE location, the UE may use a map providing the borders between the countries for which MCCs are assigned by ITU, in combination with a database storing which PLMNs (defined by the combination of MCC+Mobile Network Code (MNC) broadcasted by the network) are allowed to operate in which countries. However, as noted above, these borders may not be strict. It may be assumed that there are certain areas/stripes on each side of the border where the PLMN of one country is allowed to operate in the neighboring country.

Even when such a map and database is available to the UE, the UE could try to register to a PLMN outside its legal coverage, for example, if the UE has an outdated map or database, or if the UE location determined by the network is different from the location estimated by the UE itself.

Regardless of the reasons for which the UE may attempt PLMN access outside of the legal operating area of the PLMN, it is the responsibility of the operator to ensure that services are not provided outside the country/region where the network is allowed to operate. Therefore, the network should reject the registration request accordingly.

If the network rejects the UE with the new cause #78 "PLMN not allowed to operate at the present UE location", it would be useful to provide the UE with certain criteria regarding areas, in the vicinity of the current UE location, where UE registration attempts would continue to be rejected. In this way, the UE will be prevented from attempting further registration attempts, which would again be rejected by the network. Without such criteria, the UE may continuously attempt to register to the PLMN, wasting UE processing capacity and/or battery life. This information may also provide some guidance to the UE regarding where a new registration attempt might be successful. Thus, when the UE has moved to a new location where the PLMN is allowed to operate, the UE may again attempt to access the PLMN.

According to various exemplary embodiments described herein, the network may provide the UE with a set of attributes for the new reject cause #78 "PLMN not allowed to operate at the present UE location" which indicate when and where the restriction to re-attempt registration is applicable. The cause code, and the associated attributes, may also be indicated in a service rejection or a deregistration request from the PLMN.

In some exemplary embodiments, the network may provide the UE with geographical information defining an area within which the UE shall consider that the PLMN is not allowed to operate. This geographical information may be provided together with the reject cause code as described above. The geographical information may be provided in one of the following forms, although this list should not be considered exhaustive. For example, the geographical information may comprise 1) a circle defined by a particular midpoint (latitude/longitude) and radius; 2) a circle defined by a midpoint and radius wherein the midpoint is determined as the current UE position, which the UE will estimate/fetch, 3) an ellipse defined by a major axis, minor axis and the latitude/longitude position of the two focal points of the ellipse, or 4) a polygon with n corners, each defined by a latitude/longitude position. While the UE is located in a geographical area for which the network has indicated in the registration reject that the "PLMN is not allowed to operate at the present UE location", the UE shall not attempt to register to this PLMN.

After receiving the geographical information, prior to initiating a further registration attempt on the PLMN-ID, the UE will check its current location against the stored information. For example, the UE may use a current global positioning satellite (GPS) position, e.g., a latitude/longitude position, and check whether the current position falls within the restricted area. If the current UE position falls within the indicated geographical area, then the UE will not attempt to register with the PLMN. If the current UE position falls outside the indicated geographical area, the UE may again attempt to access the PLMN.

The indicated geographical information may not fully capture the area in which the PLMN is not allowed to operate. For example, the indicated information may cover only a subset of a region/country where the PLMN cannot operate. Thus, if the UE leaves the covered area and again attempts to access the PLMN, if the new UE location is also a restricted area, then the PLMN may again reject the registration attempt and send a new geographical indication for another area in which the UE cannot attempt access. Once the UE has left the legally restricted region, if the UE again attempts access to the PLMN, the registration request may be accepted.

According to other exemplary embodiments, under certain deployment conditions, the geographical information may be provided as a list of globally unique beam IDs or globally unique cell IDs. For example, the geographical information may be provided in this manner if the deployment is such that 1) the satellite cell coverage is provided either by small cells or by downlink transmission beams within a cell, wherein the UE will receive a broadcasted system information from these cells in order to detect the cell and determine which operator, i.e., PLMN, is operating the cell, and 2) the coverage area of these beams is sufficiently small to define the area within which the PLMN is allowed to operate (including the area/stripe beyond the border where the PLMN is allowed to operate in the neighbor country). The geographical information may be provided in the following ways.

In a first option, a list of globally unique beam IDs (i.e., PLMN ID (MCC+MNC), Tracking Area ID, Cell-ID, Beam-ID) is indicated for which the UE shall consider that the PLMN is not allowed to operate, i.e., on which the UE is not allowed to trigger new registration attempts.

In a second option, a list of globally unique cell IDs (i.e., PLMN ID (MCC+MNC), Tracking Area ID, Cell-ID) is indicated for which the UE shall consider that the PLMN is not allowed to operate, i.e., on which the UE is not allowed to trigger new registration attempts.

While the UE has selected a cell or a beam of a cell for which the network has indicated in the registration reject that the "PLMN is not allowed to operate at the present UE location", the UE shall not attempt to register to this PLMN. Thus, similar to the first exemplary embodiment, prior to attempting registration on a PLMN ID, the UE will check the indicated information against the PLMN information (i.e., globally unique beam IDs or globally unique cell IDs) and determine whether the access attempt should be restricted.

According to one variant, with respect to both the first and second exemplary embodiments discussed above, the network may configure the re-attempt restriction to be applicable only for a limited period of time "T_cause_78." In other words, a timer value is indicated, i.e., a period of T_cause_78, for which, after receipt of the reject cause, the UE considers all the attributes for the received reject as valid. When the timer expires, the indicated attributes will be considered invalid.

According to another variant, with respect to the first exemplary embodiment discussed above, the UE may be provided with some default geographical information, e.g., a circle with a certain radius and the midpoint defined by the current UE position (as discussed with respect to the second geographical information option discussed above). If the PLMN sending the reject cause does not signal geographical information applicable for this specific reject message, then the UE may use the default geographical information. In the same way, the UE may also be provided with a default value for T_cause_78 which is applicable if the UE is not provided with a T_cause_78 value applicable for the specific reject message.

If the UE uses/maintains a preexisting map with borders of countries for which MCCs are assigned by ITU, and has a database defining which PLMNs are allowed to operate in which countries, the UE could combine this map with the geographical applicability received with the new reject cause "PLMN not allowed to operate at the present UE location". In this case the information received in the reject shall take precedence over the stored map and MCC database, if there is any conflict. For example, if an area is indicated as restricted by the provided information, but not indicated as restricted by the stored information, then the area will be considered restricted in view of the provided information.

As discussed above, the present embodiments provide various UE and network advantages. The UE will not attempt to register to that PLMN while located in a geographical area for which the network has indicated in the registration reject that it the "PLMN is not allowed to operate at the present UE location", i.e., it avoids unnecessary network load and UE power consumption. In consequence, it also ensures that the UE will search for other suitable cells of any Radio Access Technology of the same or a different PLMN in order to register and regain service. On the other hand, if no other PLMN is available, the exemplary embodiments help the UE to avoid staying out-of-service, even when it has moved to a new location where the PLMN is allowed to operate.

Figure 6:
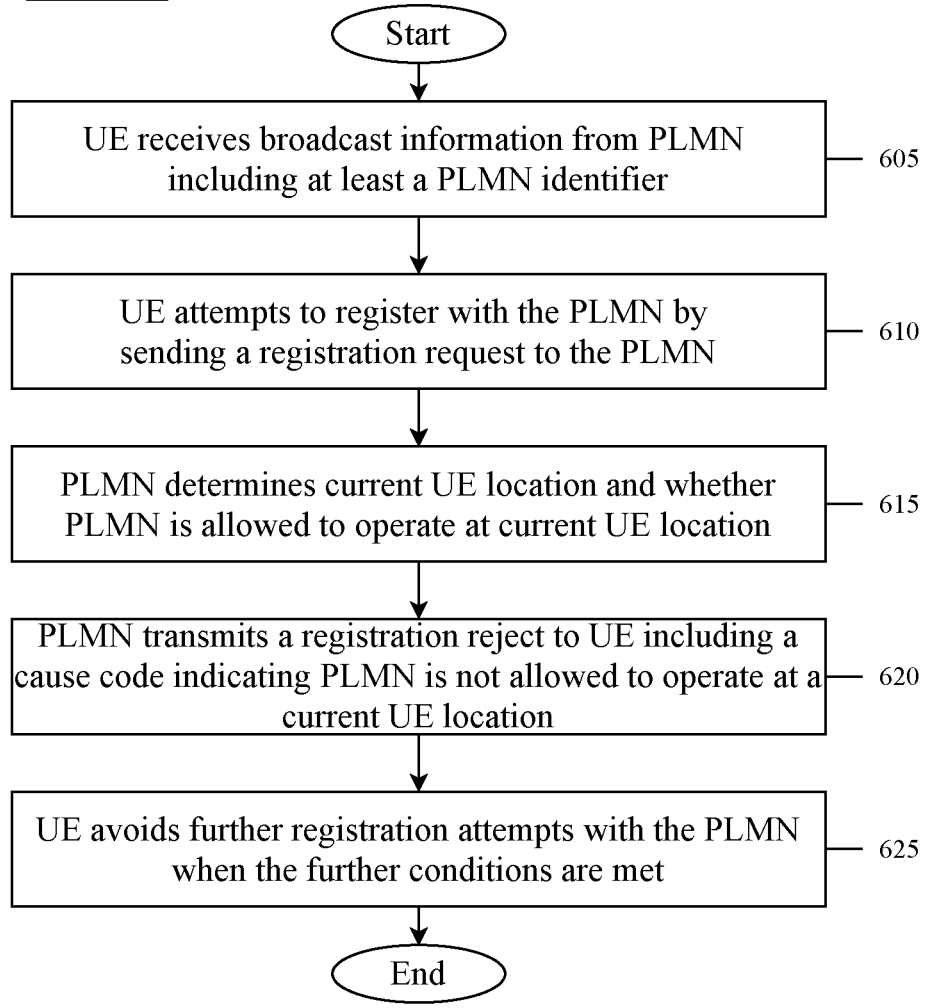
FIG. 6 shows a method for network selection according to various exemplary embodiments described herein.

FIG. 6 shows a method 600 for network selection according to various exemplary embodiments described herein.

In 605, a user equipment (UE) receives broadcast information from a public land mobile network (PLMN) including at least a PLMN identifier (ID). The PLMN ID may comprise a mobile country code (MCC) in combination with a mobile network code (MNC). The information may be broadcast via a non-terrestrial network (NTN) beam deployed by the PLMN via a satellite. The base station transmitting the broadcast information may be located on the satellite, or may be located on the ground, wherein the satellite serves as a relay for the base station signals.

In 610, the UE attempts to register with the PLMN by sending a registration request to the PLMN. The registration request may be an initial registration request, or may be a mobility registration request.

In 615, the PLMN determines the current UE location and whether the PLMN is allowed to operate at the current UE location. The PLMN may be restricted from providing services at the current UE location based on legal or regulatory reasons, e.g., the PLMN is not allowed to provide services in the country in which the UE is located.

In 620, the PLMN transmits a message to the UE including a cause code indicating the PLMN is not allowed to operate at a current UE location. The message may be a registration reject message. The message may further include a set of attributes indicating further conditions wherein the registration with the PLMN is not allowed. For example, geographical information may be transmitted defining an area in which the UE should avoid further registration attempts. The information may also comprise a list of global cell IDs or global beam IDs on which the UE should avoid attempting access. In other embodiments, the cause code and the set of attributes may be transmitted in a service reject or a deregistration request from the PLMN.

In 625, the UE avoids further registration attempts with the PLMN when the further conditions are met. When the UE moves to a location in which the further conditions are not met, the UE may again attempt to access the PLMN.

EXAMPLES

In a first example, a processor of a user equipment (UE) is configured to perform operations comprising receiving broadcast information from a public land mobile network (PLMN) including at least a PLMN identifier (ID) attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link, receiving a message including a cause code indicating the PLMN is not allowed to operate at a current UE location and further including a set of attributes indicating further conditions wherein the registration with the PLMN is not allowed and avoiding further registration attempts with the PLMN when the further conditions are met.

In a second example, the processor of the first example, wherein the set of attributes indicates a list of globally unique beam IDs on which the UE should not attempt the further registration attempts.

In a third example, the processor of the second example, wherein each globally unique beam ID is defined by the PLMN ID, a tracking area ID, a local cell ID, and a local beam ID.

In a fourth example, the processor of the second example, wherein the set of attributes indicates a list of globally unique cell IDs on which the UE should not attempt the further registration attempts.

In a fifth example, the processor of the fourth example, wherein each globally unique cell ID is defined by the PLMN ID, a tracking area ID and a local cell ID.

In a sixth example, the processor of the first example, wherein the set of attributes indicates geographical information defining an area within which the UE should not attempt the further registration attempts.

In a seventh example, the processor of the sixth example, wherein the geographical information comprises a circle defined by an indicated midpoint and radius.

In an eighth example, the processor of the sixth example, wherein the geographical information comprises an ellipse defined by a major axis, a minor axis, and two focal point positions In a ninth example, the processor of the sixth example, wherein the geographical information comprises a polygon defined by N corners, wherein each corner is defined by an indicated position.

In a tenth example, the processor of the first example, wherein the non-terrestrial component comprises a satellite providing beam coverage in a region in which the PLMN is not allowed to operate.

In an eleventh example, a user equipment (UE) comprises a transceiver configured to communicate with a public land mobile network (PLMN) and a processor communicatively coupled to the transceiver and configured to perform operations comprising receiving broadcast information from the PLMN including at least a PLMN identifier (ID) attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link, receiving a message including a cause code indicating the PLMN is not allowed to operate at a current UE location and further including a set of attributes indicating further conditions wherein the registration with the PLMN is not allowed and avoiding further registration attempts with the PLMN when the further conditions are met.

In a twelfth example, a user equipment (UE) comprises a transceiver configured to communicate with a public land mobile network (PLMN) and a processor communicatively coupled to the transceiver and configured to perform operations comprising receiving broadcast information from the PLMN including at least a PLMN identifier (ID), attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link, receiving a registration reject including a cause code indicating the PLMN is not allowed to operate at a current UE location, determining further conditions wherein the registration with the PLMN is not allowed, wherein the further conditions are determined based on default geographical information defining an area within which the UE should not attempt the further registration attempts and avoiding further registration attempts with the PLMN when the further conditions are met.

In a thirteenth example, a processor of a base station configured to perform operations comprising broadcasting information from a public land mobile network (PLMN) including at least a PLMN identifier (ID), wherein the base station is deployed in a non-terrestrial network (NTN) arrangement including a non-terrestrial component configured to provide services to a user equipment (UE) via a service link, receiving a registration request for the PLMN from the UE, determining a current UE location, determining the PLMN is not allowed to operate at the current UE location and transmitting a message to the UE including a cause code indicating the PLMN is not allowed to operate at the current UE location and further including a set of attributes indicating further conditions wherein the registration with the PLMN is not allowed.

In a fourteenth example, the processor of the thirteenth example, wherein the set of attributes indicates a list of globally unique beam IDs on which the UE should not attempt the further registration attempts.

In a fifteenth example, the processor of the fourteenth example, wherein each globally unique beam ID is defined by the PLMN ID, a tracking area ID, a local cell ID, and a local beam ID.

In a sixteenth example, the processor of the thirteenth example, wherein the set of attributes indicates a list of globally unique cell IDs on which the UE should not attempt the further registration attempts.

In a seventeenth example, the processor of the sixteenth example, wherein each globally unique cell ID is defined by the PLMN ID, a tracking area ID and a local cell ID.

In an eighteenth example, the processor of the seventeenth example, wherein the geographical information comprises a circle defined by an indicated midpoint and radius.

In a nineteenth example, the processor of the seventeenth example, wherein the geographical information comprises an ellipse defined by a major axis, a minor axis, and two focal point positions In a twentieth example, the processor of the seventeenth example, wherein the geographical information comprises a polygon defined by N corners, wherein each corner is defined by an indicated position.

In a twenty first example, a base station comprises a transceiver configured to communicate with a user equipment (UE) and a processor communicatively coupled to the transceiver and configured to perform operations comprising broadcasting information from a public land mobile network (PLMN) including at least a PLMN identifier (ID), wherein the base station is deployed in a non-terrestrial network (NTN) arrangement including a non-terrestrial component configured to provide services to the UE via a service link, receiving a registration request for the PLMN from the UE, determining a current UE location, determining the PLMN is not allowed to operate at the current UE location and transmitting a message to the UE including a cause code indicating the PLMN is not allowed to operate at the current UE location and further including a set of attributes indicating further conditions wherein the registration with the PLMN is not allowed.

In a twenty second example, the base station of the twenty first example, wherein the message further includes a set of attributes indicating further conditions wherein the registration with the PLMN is not allowed.

In a twenty third example, the base station of the twenty second example, wherein the set of attributes indicates geographical information defining an area within which the UE should not attempt the further registration attempts.

In a twenty fourth example, the base station of the twenty third example, wherein the geographical information comprises a circle defined by the radius, wherein the UE determines a midpoint based on the current UE location.

In a twenty fifth example, the base station of the twenty third example, wherein the geographical information comprises default geographical information defining an area within which the UE should not attempt the further registration attempts.

In a twenty sixth example, the base station of the twenty fifth example, wherein the default geographical information comprises a circle with a default radius.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    receiving broadcast information from a public land mobile network (PLMN) including at least a PLMN identifier (ID);
    attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link;
    receiving a message including a cause code indicating the PLMN is not allowed to operate at a current UE location and further including a set of attributes indicating further conditions wherein the registration with the PLMN is not allowed; and
    avoiding further registration attempts with the PLMN when the further conditions are met.

2. The processor of claim 1, wherein the set of attributes indicates geographical information defining an area within which the UE should not attempt the further registration attempts.

3. The processor of claim 2, wherein the geographical information comprises a circle defined by the radius, wherein the UE determines a midpoint based on the current UE location.

4. The processor of claim 2, wherein the operations further comprise:
    determining an updated UE position;
    checking the updated UE position against the geographical information; and
    avoiding further registration attempts when the updated UE position falls within the defined area.

5. The processor of claim 2, wherein the operations further comprise:
    determining an updated UE position;
    checking the updated UE position against the geographical information; and
    attempting the registration with the PLMN by sending the registration request to the PLMN when the updated UE position falls outside the defined area.

6. The processor of claim 1, wherein the message further includes a timer value indicating a time duration for which the UE should avoid the further registration attempts with the PLMN when the further conditions are met.

7. The processor of claim 1, wherein the UE uses preexisting geographical information defining an area within which the UE should not attempt the further registration attempts, wherein the set of attributes indicates geographical information defining a further area within which the UE should not attempt the further registration attempts, wherein the operations further comprise:
    using the indicated geographical information when the indicated geographical information is in conflict with the preexisting geographical information.

8. The processor of claim 1, wherein the message is a registration reject, a service reject or a deregistration request.

9. A processor of a user equipment (UE) configured to perform operations comprising:
    receiving broadcast information from a public land mobile network (PLMN) including at least a PLMN identifier (ID);
    attempting a registration with the PLMN by sending a registration request to the PLMN, wherein the UE attempts the registration via a base station operated by the PLMN deployed in a non-terrestrial network (NTN) arrangement including a non-terrestrial component configured to provide services to the UE via a service link;
    receiving a registration reject including a cause code indicating the PLMN is not allowed to operate at a current UE location;
    determining further conditions wherein the registration with the PLMN is not allowed, wherein the further conditions are determined based on default geographical information defining an area within which the UE should not attempt the further registration attempts; and
    avoiding further registration attempts with the PLMN when the further conditions are met.

10. The processor of claim 9, wherein the default geographical information comprises a circle with a default radius.

11. A processor of a base station configured to perform operations comprising:
    broadcasting information from a public land mobile network (PLMN) including at least a PLMN identifier (ID), wherein the base station is deployed in a non-terrestrial network (NTN) arrangement including a non-terrestrial component configured to provide services to a user equipment (UE) via a service link;
    receiving a registration request for the PLMN from the UE;

determining a current UE location;
determining the PLMN is not allowed to operate at the current UE location; and
transmitting a message to the UE including a cause code indicating the PLMN is not allowed to operate at the current UE location.

12. The processor of claim 11, wherein the non-terrestrial component comprises a satellite providing beam coverage in a region in which the PLMN is not allowed to operate.

13. The processor of claim 11, wherein the message further includes a set of attributes indicating further conditions wherein the registration with the PLMN is not allowed.

14. The processor of claim 13, wherein the set of attributes indicates geographical information defining an area within which the UE should not attempt the further registration attempts.

15. The processor of claim 14, wherein the geographical information comprises a circle defined by the radius, wherein the UE determines a midpoint based on the current UE location.

16. The processor of claim 14, wherein the geographical information comprises default geographical information defining an area within which the UE should not attempt the further registration attempts.

17. The processor of claim 16, wherein the default geographical information comprises a circle with a default radius.

18. The processor of claim 11, wherein the message is a registration reject.

19. The processor of claim 11, wherein the message further includes a timer value indicating a time duration for which the UE should avoid the further registration attempts with the PLMN when the further conditions are met.

20. The processor of claim 19, wherein the message is a registration reject, a service reject or a deregistration request.

* * * * *